S. A. CONRAD.
Stone Jug.
No. 222,671. Patented Dec. 16, 1879.
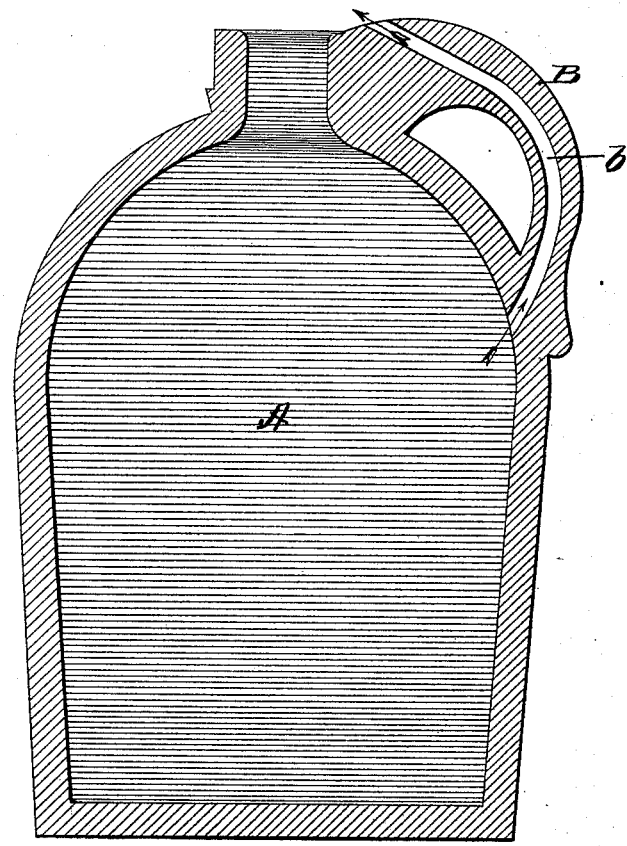
WITNESSES
F. L. Ourand
J. J. McCarthy
INVENTOR
Samuel A. Conrad
Alexander Mason
ATTORNEYS
N. PETERS, PHOTO-LITHOGRAPHER, WASHINGTON, D. C.

UNITED STATES PATENT OFFICE.

SAMUEL A. CONRAD, OF TERRE HAUTE, INDIANA.

IMPROVEMENT IN STONE JUGS.

Specification forming part of Letters Patent No. 222,671, dated December 16, 1879; application filed April 23, 1879.

*To all whom it may concern:*

Be it known that I, SAMUEL A. CONRAD, of Terre Haute, in the county of Vigo, and in the State of Indiana, have invented certain new and useful Improvements in Stone Jugs; and I do hereby declare that the following is a full, clear, and exact description thereof, reference being had to the accompanying drawing, and to the letters of reference marked thereon, making a part of this specification.

My invention relates to that class of earthen jugs known as "stone" jugs; and it consists in a vent running from the inside of the jug wholly or partially through the handle, as will be hereinafter more fully set forth.

In order to enable others skilled in the art to which my invention appertains to make and use the same, I will now proceed to describe its construction and operation, referring to the annexed drawing, which represent a vertical section of a jug embodying my invention.

A represents a jug made of earthenware, and formed with the handle B in one piece in any of the known and usual ways. Lengthwise through the handle B is made a passage or vent, $b$, which commences from the inside of the jug, and extends, as shown, through the entire handle, having its end at the top, near the mouth of the jug. It is, however, not necessary that this vent should extend entirely through the whole handle. It may terminate at any point on the handle desired—that is to say, this passage or vent commences inside the jug and runs wholly or partially through the handle. Such vent may in like manner be made in the handles of other earthen vessels if desired, though I intend it especially for jugs. In filling the jug the air is by this means allowed to escape; and in pouring out the contents the air is allowed to enter and fill the space.

I am aware that cans, bottles, and other similar vessels have been provided with air-vents, and I do not claim such, broadly, as my invention.

Having thus fully described my invention, what I claim as new, and desire to secure by Letters Patent, is—

As an article of manufacture, an earthen jug, A, formed in one piece with a handle, B, through which is an air-passage, $a$, the exit whereof is on the outside of the handle away from the mouth of the jug, substantially as and for the purposes herein set forth.

In testimony that I claim the foregoing I have hereunto set my hand this 10th day of April, 1879.

SAMUEL A. CONRAD.

Witnesses:
   G. CONRAD,
   M. HALEY.